(12) United States Patent
Cleaver

(10) Patent No.: US 8,540,840 B2
(45) Date of Patent: Sep. 24, 2013

(54) METHOD OF MAKING HIGH TEMPERATURE RESISTANT MODELS OR TOOLS

(75) Inventor: Matthew Cleaver, Nottinghamshire (GB)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 0 days.

(21) Appl. No.: 12/724,742

(22) Filed: Mar. 16, 2010

(65) Prior Publication Data

US 2010/0233380 A1    Sep. 16, 2010

Related U.S. Application Data

(62) Division of application No. 10/564,149, filed as application No. PCT/EP2005/055858 on Nov. 9, 2005, now Pat. No. 7,708,858.

(30) Foreign Application Priority Data

Nov. 17, 2004    (EP) .................................... 04270010

(51) Int. Cl.
| | |
|---|---|
| *B29C 65/00* | (2006.01) |
| *B29C 33/40* | (2006.01) |
| *B32B 37/00* | (2006.01) |
| *B32B 38/10* | (2006.01) |
| *B32B 27/00* | (2006.01) |
| *B28B 1/00* | (2006.01) |
| *B28B 3/00* | (2006.01) |
| *B28B 5/00* | (2006.01) |
| *C04B 33/32* | (2006.01) |
| *C04B 33/36* | (2006.01) |
| *C04B 35/64* | (2006.01) |
| *C08G 65/04* | (2006.01) |

(52) U.S. Cl.
USPC ........... 156/280; 156/154; 264/220; 264/643; 528/421

(58) Field of Classification Search
USPC .................... 156/153, 154, 244.12, 278, 280, 156/295; 264/219, 220, 642, 643; 528/403, 528/405, 406, 407, 408, 409, 410, 411, 412, 528/413, 414, 415, 416, 417, 418, 419, 420, 528/421
See application file for complete search history.

(56) References Cited

U.S. PATENT DOCUMENTS

| | | | |
|---|---|---|---|
| 3,652,486 A | 3/1972 | Young | |
| 3,668,177 A * | 6/1972 | Van Herpt | ................. 260/37 EP |
| 3,861,936 A | 1/1975 | Winter | |

(Continued)

FOREIGN PATENT DOCUMENTS

| | | |
|---|---|---|
| EP | 0365479 | 4/1990 |
| EP | 0662380 | 7/1995 |

(Continued)

*Primary Examiner* — Philip Tucker
*Assistant Examiner* — Brian R Slawski

(57) ABSTRACT

A method of making High Temperature Resistant Models and Tools is provided. An assembly of substrates can be formed with intermediate adhesive layer of curable paste and same curable paste can be used as topcoat or sealer. The curable paste can be machine dispensed from a mixer mixing 2 components composition. The composition can contain a resin, a filler, a chemical thixotropy agent, a latent hardener and another hardener. The method provides easy and cost-effective manufacture of models or tools.

5 Claims, 1 Drawing Sheet

TOOL PRODUCTION PROCESSES

Traditional process

Boeing process

Inventive Process

(56) References Cited

U.S. PATENT DOCUMENTS

| | | | |
|---|---|---|---|
| 4,528,305 A * | 7/1985 | Henry | 523/219 |
| 4,732,962 A * | 3/1988 | Atkins et al. | 528/94 |
| 4,929,650 A * | 5/1990 | Kurauchi et al. | 523/455 |
| 4,977,214 A | 12/1990 | Bagga | |
| 5,021,513 A * | 6/1991 | Bagga | 525/328.8 |
| 5,198,062 A * | 3/1993 | Chen | 156/245 |
| 5,707,477 A * | 1/1998 | Cloud | 156/292 |
| 5,773,047 A | 6/1998 | Cloud et al. | |
| 5,817,737 A | 10/1998 | Mariaggi et al. | |
| 5,859,096 A | 1/1999 | Hoge et al. | |
| 5,942,182 A | 8/1999 | Hoge et al. | |
| 5,993,909 A * | 11/1999 | Mizutani et al. | 427/379 |
| 6,060,540 A * | 5/2000 | Wanthal et al. | 523/444 |
| 6,077,886 A * | 6/2000 | Hayes et al. | 523/466 |
| 2004/0013865 A1* | 1/2004 | Kotnis et al. | 428/304.4 |
| 2005/0233023 A1 | 10/2005 | Cleaver | |

FOREIGN PATENT DOCUMENTS

| | | | |
|---|---|---|---|
| EP | 0901849 | | 3/1999 |
| GB | 2383009 A | * | 6/2003 |
| WO | WO 02/20261 | | 3/2002 |
| WO | WO 03/051649 | | 6/2003 |

* cited by examiner

TOOL PRODUCTION PROCESSES
Traditional process
Boeing process
Inventive Process

METHOD OF MAKING HIGH TEMPERATURE RESISTANT MODELS OR TOOLS

CROSS REFERENCES TO RELATED APPLICATIONS

This application is a divisional of U.S. patent application Ser. No. 10/564,149, now U.S. Pat. No. 7,708,858, which is the National Phase of International Application PCT EP/2005/055858 filed Nov. 9, 2005 which designated the U.S. and which was published in English and which claims priority to EP Pat. App. No. 04270010.4 filed Nov. 17, 2004. The noted applications are incorporated herein by reference.

FIELD OF THE INVENTION

The present invention is concerned with a method of making a high temperature resistant model or tool using a curable paste and with models or tools made using the method.

BACKGROUND OF THE INVENTION

In various industries (for example, the automotive, wind energy and aerospace industries), it is common practice to produce large, dimensionally accurate master models and tools. Models are used by engineers for the conceptual design of individual component parts of the final product. Tools are used for the creation of final parts. A model or prototype is usually used once or twice and is designated mainly on getting the external shape of an object. A tool or mould is designated to provide a negative of the external shape of the object and to allow manufacturing of the object itself, preferably several times. It follows that requirements for tools are more stringent than for making models.

U.S. Pat. No. 5,942,182 describes a resin transfer moulding (RTM) process used e.g. in the aerospace industry, comprising impregnating a fibre preform in a mould with a one component, room temperature stable, epoxy resin composition comprising a novolak resin, an epoxy diluent and a latent curing agent, typically a boron trichloride amine complex, to cure above specified temperatures.

The patent application WO 02/20261 describes making a seamless model comprising applying a mechanically frothed syntactic foam as modeling paste on the outer surface of a substructure, curing the paste and machining it.

A traditional method of making a tool, illustrated as "Traditional Process" in FIG. 1, involves making a mold from boards or SMP (Seamless Modelling Paste), applying a laminate on the backing structure, the laminate being further separated from the mold to produce a laminated tool. This method involves several different steps, it is lengthy and requires preliminary master model fabrication.

Another known method to produce large tools involves a "building block" approach in which several boards are glued together to produce a rough structure, which is then machined to form the desired shape. This approach, however, is both labour and time intensive and requires precision operations, leading to high cost, and moreover results in a model, which has visually perceivable bond-lines at the surface, an appearance which is aesthetically undesirable and may even cause surface defects on final parts.

U.S. Pat. Nos. 5,707,477 and 5,773,047 describe a method for making a model or tool including steps of:
fabricating a base with a top plate of aluminum,
bonding successive layers of perforated aluminum honeycomb core with a suitable adhesive until the desired height is reached,
machining the stack of aluminum honeycomb core layers to the desired tolerance under the desired final contour,
applying a layer of syntactic epoxy to the machined aluminum core surface—this is accomplished by applying syntactic epoxy patties to the machined surface, and then forming the patties into a continuous layer by kneading the patties together and "seating" them into the core cells with moderate hand pressure,
curing the epoxy layer, machining it to the final contour desired, then seal the structure with an epoxy sealer.

This method is illustrated as "Boeing process" on FIG. 1. However, this approach is again labour and time intensive, in that it involves stacking and bonding of the honeycomb core and hand application of the pliable solid patties. The method requires heating of the entire structure in order to cure the applied patties. The resulting models are also of relatively high density. Several different materials must be used, e.g. foaming adhesives and hand spread patties. The use of several materials can cause problems in matching the adhesive bond lines to the ultimate molding material.

U.S. Pat. No. 5,859,096 provides patties made of a one-component epoxy resin tooling material providing cured composition having high Tg and low Coefficient of Thermal Expansion CTE. The composition contains an epoxy resin, an epoxy diluent, a boron trichloride amine complex and a silica or silicate filler. The patties are butted together and rolled out to form a layer covering the substructure which is then heat cured.

Thus, there still remains a need for a model or tool and a method of producing models or tools, where the model or tool is characterised by low production costs, fast processes and a more uniform surface having improved smoothness and free of bondlines. Easy cutting, combined with machine (lathe, CNC or other forms) cuttability are desired attributes. Furthermore, there is growing need to produce tools which can withstand high temperatures, preferably greater than 120 C, more preferred greater than 150 C. Such temperature resistant tools in turn allow production of high temperature cure-able and resistant composites or laminates. In turn these composites are finding greater use as light weight strong objects in aerospace, auto, marine, wind energy, civil construction [e.g. leisure facilities, exhibitions, films and theater models). Such large models would benefit of having fire retardant properties.

SUMMARY OF THE INVENTION

A method of making High Temperature Resistant Models and Tools is provided. An assembly of substrates can be formed with intermediate adhesive layer of curable paste and same curable paste can be used as topcoat or sealer. The curable paste can be machine dispensed from a mixer mixing 2 components composition. The composition can contain a resin, a filler, a chemical thixotropy agent, a latent hardener and another hardener. The method provides easy and cost-effective manufacture of models or tools.

A curable paste can be defined as a curable composition or mixture which is not solid like ice but not fully fluid as water at room temperature (20 C or 25 C). A paste can be applied, for example from a nozzle, on a flat surface and retain at least some of its initial shape.

According to the present invention, there is provided a method of making a temperature resistant model or tool which comprises the steps of: stacking and bonding support layers, applying a paste to a support; and curing the paste; and after final assembly of the model, machining the cured paste of the surface to a desired or pre-determined contour; in which the paste is a thixotropic curable paste with a temperature resistance greater than 120° C.

There is also provided a method of producing a model or tool comprising
(a) building an assembly of substrates by assembling and adhering a substrate to another substrate with a layer of adhesive paste, preferably building a stack assembly of substrates adhered with several intermediate layers of adhesive paste,
(b) optionally machining the assembly of substrates,
(c) covering the outer surface of the assembly of substrates with a continuous layer of curable paste preferably machine dispensed, and
(d) optionally after cure, machining to the final structure, preferably according to a computer design, wherein the composition of the curable paste of step (c) is the same as the composition of at least one of the adhesive paste layers of step (a).

There is further provided a method of producing a model or tool comprising the sequential steps of:
mixing 2 components to form a curable paste, preferably an epoxy component containing a curable epoxy resin, and a hardener component containing a latent hardener and another hardener,
applying the paste on the outer surface of a substructure in the form of a continuous layer, curing the continuous layer of paste,
and machining said cured layer to the desired contour.

There is also provided a composition comprising:
(1) an epoxy resin;
(2) a thixotropic agent in an amount sufficient to induce thixotropic properties; and
(3) a hardener system comprising (a) at least one polyethyleneimine, (b) at least one other amine having at least two amino hydrogen groups and (c) at least one other epoxy curative having latent reactivity (requiring heat to fully react), the combined amounts of (a), (b) and (c) being sufficient to effect cure of the epoxy resin.

BRIEF DESCRIPTION OF THE DRAWINGS

The present invention may be understood with reference to the following drawing:
FIG. 1 depicts tool production processes.

DETAILED DESCRIPTION OF THE INVENTION

The present invention can provide a 2 component formed paste which can be handled in machine dispensers and thus take advantage of extra storage stability prior to mixing.

A further aspect concerns curable, machine dispensable compositions which cure up rapidly under mild conditions, and which adhere the individual substrates together, making up a large model or tool.

The composition can be used as adhesive to form an assembly of substrates or to form the final surface coating of the assembly of substrates. Preferably the same composition is used as adhesive to adhere the substrates together and form the assembly and as outer coating on the outer surface of the assembly.

The same composition is able to form the final surface coating, which covers the entire model or tool seamlessly, cures rapidly under trade shop conditions and is machine-able to the final design.

Finally the same composition cures up to yield high temperature resistance material, i.e. thus provides a model or tool capable of resisting distortion/warping under the temperature of use (e.g. withstands conditions of at least 120 C).

The method and composition according to the invention permit to obtain one or more of the following:
build quickly a tool with output automated equipment,
form high thickness layers in one application (for example up to 4 cm),
low level of exotherm,
low odour during application and cutting,
room temperature curing,
high HDT especially after post cure,
high dimensional stability.

The method and composition can be used to produce tools for prepregs and high temperature laminating process.

Preferably, the resin composition comprises a resin system; a thixotropic agent in an amount sufficient to induce thixotropic properties; and a hardener system containing a hardener. The hardener system preferably comprises at least one chemical thixotropic agent, preferably a polyethyleneimine compound. The hardener preferably comprises a hardener and a latent (also designated as "semi" latent) hardener. Preferably the latent hardener is a hardener requiring heat above room temperature to effect curing. Preferred are latent hardener are those curing the resin when subjected to a temperature of at least 50 C, preferably at least 70 C, more preferably at least 80 C, more preferably at least 90 C.

Preferably the resin composition is cured at room temperature. Surprisingly, the resin composition may be allowed to a first cure at room temperature while benefiting of the presence of the latent curing hardener which is only effective at higher temperatures. The composition can be post-cured at high temperature. Preferably the post cure is effected at a temperature of at least 130 C. Preferably the maximum temperature attained during post cure is 220 C, more preferably 200 C.

Preferably, the resin composition comprises an epoxy resin; a thixotropic agent in an amount sufficient to induce thixotropic properties; and a hardener system comprising at least one chemical thixotropic agent such as polyethyleneimine and at least one (other) amine having at least two amine hydrogen groups, the combined amounts of the two amines being sufficient to effect cure of the epoxy resin.

Importantly, latent or semi-latent amine hardeners are used in the hardener system, combined with a more active, non latent hardener. This enables control of exotherm and a softer material is produced rapidly allowing an easier intermediate cutting stage. Final thermal cure yields a high Tg material. Examples of the latent or semi latent amine hardeners are Diethyl toluene diamine, Dicyandiamide, Diphenyl diamino sulphone, Boron complexes (e.g. amine-boron, or alkoxide-boron complexes), imidazoles and others as known in the art.

Especially preferred latent hardeners are certain complexes of boron-containing compounds with amines such as borane-amine complexes and amino complexes of boron halides, for example a boron trichloride- or boron trifluoride-amine complex.

More generally, the latent or semi latent hardener can be a complex (sometimes referred to as a coordination compound) of a Lewis acid and a Lewis base. A Lewis acid is a substance which can accept an electron pair from a base. A Lewis base is a substance which can donate an electron pair. The donated electron pair is then shared between acid and base.

The Lewis acid may for example be $BX_3$, $AlX_3$, $FeX_3$, $FeX_2$, $ZnX_2$, $TiX_3$ or $TiX_4$ where each X independently represents a C(1-6) alkyl or C(1-6) alkoxy group or a hydrogen, chlorine, bromine, iodine or fluorine atom, provided that when the Lewis acid is BX3 no X represents a fluorine atom. Boron trifluoride has been found to be unsuitable for use in the present invention, being ineffective as a stabilizer, instead acting to cure the composition. Preferably each X is the same. Where X is an alkyl group, it is preferably an ethyl group. Where X is a halogen atom, it is preferably a bromine, iodine or, especially, chlorine atom. Preferably the Lewis acid is BX3, especially BH3 or BCl3, or an iron III halide, especially FeCl3. The Lewis base may for example be ammonia, phosphine, an amine or a phosphine. Preferred amines and phosphines include amines and phosphines of the general formula $Z(R8)_3$ (IV) in which Z is nitrogen or phosphorus, and each Ra independently represents a hydrogen atom (provided that not more than two R8 groups represent hydrogen); an alkyl group having from 1 to 20, preferably from 1 to 8, for example from 1 to 4, carbon atoms, optionally substituted by one or more phenyl groups (in which the phenyl group may be optionally substituted by one or more C (1-12) alkyl groups and/or halogen atoms) or C (5-7) cycloalkyl groups; a phenyl group optionally substituted by one or more C(1-12) alkyl groups and/or halogen atoms; or a C (5-7) cycloalkyl group; or two R8's together represent an alkylene group having from 4 to 6 carbon atoms one or more of which may be replaced by an oxygen or a sulphur atom; and in which each alkyl, cycloalkyl or phenyl group present in the compound of the formula IV may be optionally substituted by one or more, preferably one or two, groups—$Z(Rs)_2$-. For example, each R8 may independently represent a C (1-12) alkyl group or a phenyl group.

Preferably the complex is an amine complex. Such complexes may be made by known methods and many are available commercially. Particular examples of suitable complexes include the following; borane ammoniac complex; borane triethylamine complex; borane tributylphosphine complex; borane trimethylamine complex; borane triphenylphosphine complex; borane tributylamine complex; borane N,N-diethylamine complex; borane N,N-diisopropylethylamine complex; borane dimethylamine complex; borane N-ethyl-N-isopropyl aniline complex; borane 4-methylmorpholine complex; borane 4-ethylmorpholine complex; bis-(triethylborane) 1,6-diaminohexane complex; trichloroborane N,N-dimethyloctylamine complex; trichloroborane triethylamine complex; trichloroborane pyridine complex; trichloroborane benzylamine complex; irontrichloride triethylamine complex; irontrichloride pyridine complex; and irontrichloride N,N-dimethyloctylamine.

Typically the complex contains one equivalent of a Lewis acid per equivalent of Lewis base, for example one equivalent of a compound of formula BX3 per equivalent of amine or phosphine.

The present invention provides a method of making a seamless model or tool free of bond lines and includes the sequential steps of bonding a substructure having an exposed outer surface, applying a paste to the outer surface of the substructure in the form of a continuous layer, curing the continuous layer of applied paste, and machining said cured layer of modelling paste to the desired contour. This method is referred to as "net size casting" using, shown in FIG. 1 a "seamless modelling paste" (SMP). This technique is used commercially.

In the present invention, the paste used is preferably characterised by being a machine dispensable curable mixture containing a temperature resistant resin, and can function both as an adhesive paste to adhere various substrates together and as a surface paste which smoothly covers the whole model or tool and is machine-able to create a seamless surface.

It has been found that the paste layer formed from a composition comprising latent hardener and thixotropic agent can be applied as a layer on a substructure or on assembly of substrates, is malleable, can be further shaped if required and cut before cure.

The undersized support structures used in accordance with the present invention, and the methods of making these structures, may be known in the art and may be of the same type of structure typically produced as a back support for conventional board models. The structure may be used as a core onto which the modelling paste can be applied. Examples of materials from which the support structure is made include, but are not limited to, low-density foams made for example from polyurethane or epoxy materials, honeycomb made from aluminium or fibre reinforced plastic. One examples of such honeycomb is Nomex made by Hexcel composites.

Compositions

The resin mixture is preferably a temperature resistant curable thermoset.

Suitable thermosets can be those derived from epoxy-amine, anhydrides, isocyanate-polyol, acrylic-amine, epoxy-amine-phenolic etc addition polymerisation materials and hybrid mixtures thereof. In particular, 2 component thermosets are preferred as these can be conveniently made storage stable and yet be machine mixed and dispensed. Preferred thermosets are those containing fillers so that paste-like consistency can be achieved, which is highly desired for non-slump characteristics after dispensing or extrusion. Non-slump characteristics allow ready use without unwanted dripping of applied material. Fillers can be used for achieving also required application density: e.g. dense filler such as aluminium for good compressive strengths, and hollow microspheres for low density light weight. For models, low density fillers maybe more useful whereas for tool applications the more dense fillers are preferred. Fillers are chosen furthermore such that they do not impeded the curing of the thermoset materials and they do not lead to excessive dust formation during the machining phase to form final model or tool.

It is preferred that the composition, preferably a two-component composition, has a high viscosity shortly after mixing to provide a resistance to slump, i.e. a change in shape once the mixed composition has been placed in a desired location. The degree of non-slumping required can even be that of retaining almost exactly the shape and dimensions achieved by extruding the compositions through a shaped orifice. This non-slump texture is frequently obtained by dispersing a thixotropic agent such as a hydrophilic fumed silica in one of the components to blends, provided sufficient thixotropic agent is used, that generally retain their shape and non-slump properties until they are gelled and cured. A thixotropic composition can be defined as a composition whose viscosity under shear is lower than under no shear.

The two-component composition may contain a Part A containing the resin or resin system and a Part B containing the hardener (system). Parts A and B are mixed in amount such as to the amount of part B is sufficient to cure the curable resin contained in part A. Density of the parts are often quite the same so that the ratios can be easily defined by volume.

A preferred curable paste composition comprises (1) an epoxy resin; (2) a thixotropic agent in an amount sufficient to induce thixotropic properties; and (3) a hardener comprising (a) at least one polyethyleneimine, (b) at least one other amine having at least two amino hydrogen groups and (c) at least one other epoxy curative having latent reactivity (requiring heat to fully react), the combined amounts of (a), (b) and (c) being sufficient to effect cure of the epoxy resin.

Preferred curable epoxy resin/hardener mixtures are described, for example, in U.S. Pat. No. 6,077,886.

The epoxy resin (1) may consist of one or more epoxy resins which are themselves liquid or may be a liquid mixture of one or more solid epoxy resins with one or more liquid epoxy resins or may be one or more solid epoxy resins dissolved in a diluent such as any diluent conventionally used in epoxy resin compositions. The epoxy resin may be a polyglycidyl ether of a polyhydric alcohol such as 1,4-butanediol or 1,3-propanediol or, preferably, a polyglycidyl ether of a polyhydric phenol, for example a bisphenol such as bis(4-hydroxyphenyl)methane (bisphenol F) or 2,2-bis-(4-hydroxyphenyl)propane (bisphenol A), a novolak formed from formaldehyde and a phenol such as phenol itself or a cresol, or a glycidylamine for example N,N,N',N'-tetraglycidyl-4, 4'methylene bisbenzenamine or a mixture of two or more such epoxies. Polyglycidyl ethers of bisphenol A and glycidylamines are especially preferred. The epoxy resin, particularly where it comprises a solid epoxy resin, may contain one or more epoxy-functional diluents, usually monoepoxides, or non-epoxide diluents, such as the monoepoxide and non-epoxide diluents conventionally used in curable epoxy resin compositions. Examples of glycidylamine resins are MY 721 and MY 0510 from Huntsman and Tetrad X and Tetrad C available from Misubushi Gas Chemicals Co.

The thixotropic agent (2) is preferably a thixotropic agent which, it is believed, relies largely on interparticle hydrogen bonding to achieve its thixotropic effect, especially a hydrophilic fumed silica or another silicate. The amount of thixotropic agent required to induce thixotropic properties may depend on the nature of the specific epoxy resin and specific thixotropic agent used. This amount is generally from 1 to 20%, preferably from 3 to 15%, by weight based on the weight of the epoxy resin (1). This is a "physical" thixotropic agent.

Preferably, the composition, especially the hardener system portion of the composition, contains also chemical thixotropic agent in addition to the (physical) thixotropy agent. A preferred chemical thixotropic agent is polyethyleneimine which may have a molecular weight (Mw) from 700 to 1,000,000 or more, preferably from 5000 to 750,000, especially from 25,000 to 750,000, particularly about 750,000. Such polyethyleneimines are commercially available or may be prepared from ethyleneimine by known procedures.

The amount of polyethyleneimine is generally chosen so that the epoxy resin composition of the invention does not flow during a desired time after the formation of the composition. Preferably, the amount of polyethyleneimine is such that the epoxy resin composition does not flow for at least 60 minutes after formation thereof. In certain specific embodiments of the invention, the amount of polyethyleneimine is such that the epoxy resin composition does not flow prior to its gelation, which in some instances requires several hours. The amount of polyethyleneimine needed to impart non-flow properties for a given time can be readily determined by simple experiment. For compositions of the invention containing the especially preferred components (1), (2) and (3)(b) described herein, an amount of polyethyleneimine from 0.2 to 2 parts by weight per 100 parts by weight of the epoxy resin is preferred.

Examples of amines suitable for use as the amine hardener (3)(b) include those aliphatic, cycloaliphatic, aromatic, araliphatic and heterocyclic amines known as hardeners for epoxy resins, including: alkylenediamines such as ethylenediamine or butane-1,4-diamine; polyalkylenepolyamines such as diethylenetriamine, triethylenetetramine, tetraethylenepentamine, dipropylenetriamine or tripropylenetetramine; N-hydroxyalkyl derivatives of polyalkylene polyamines such as N-(hydroxyethyl) diethylenetriamine or mon-N-2-hydroxypropyl derivative of triethylenetetramine; polyoxyalkylenepolyamines such as polyoxyethylene—and polyoxypropylene—diamines and triamines; N,N-dialkylalkylenediamines such as N,N-dimethylpropane-1,3-diamine or N,N-diethylpropane-1,3-diamine; cycloaliphatic amines having an amino or aminoalkyl group attached to the ring, such as 3-aminomethyl-3,5,5-trimethylcyclohexylamine (isophoronediamine); aromatic amines such as bis(4-aminophenyl)methane or bis(4-aminophenyl)sulphone; amine-terminated adducts of epoxy resins with aliphatic, cycloaliphatic or araliphatic amines as hereinbefore described; N-aminoalkyl-piperazines such as N-(2-aminoethyl)piperazine or N-(3-aminopropyl)piperazine; and polyaminoamides, for example reaction products of polyalkylenepolyamines such as those hereinbefore mentioned with polymerised unsaturated fatty acids, e.g. polymerised vegetable oil acids such as dimerised or trimerised linoleic or ricinoleic acids; or a mixture of two or more of such amines.

Aromatic, aliphatic and cycloaliphatic amine hardeners are usually preferred for use as component (3)(b) of the composition. The amount of (3)(b) is preferably such that (3)(a) and (3)(b) together provide from about 0.75 to 1.25 amino hydrogen equivalents per 1,2-epoxide equivalent of the epoxy resin (1).

The latent or semi-latent hardener (3)(c) is any slow reacting epoxy curative which cures slowly or not at all at normal ambient temperature requiring heat to cause full reaction. Unusually, it is found that the pastes, exemplified herein with this type of latent hardener, allow ready assembly of the substrates, wherein the pastes cure to a soft malleable adherent consistency, providing stable support to the assembly of substrates. After full assembly, the model is then cure-able at much higher temperatures without distortion.

The epoxy resin composition may be formed conveniently by stirring a preformed mixture of (1) and (2) together with a preformed mixture of (3)(a) and (3)(b). The thixotropic agent may also be conveniently present in the hardener mixture.

The seamless modelling paste prepared in accordance with the present invention may also contain additional ingredients, such as diluents, fillers (such as calcium carbonate), fibres, pigments, dyes, fire retardants, antifoaming agents, wetting agents and polymeric toughening agents. It has also been found that the addition of calcium stearate improves the machinability of the cured material and so its addition is also advantageous. These auxiliary materials may be conveniently added with the hardener component, or they may be added with the resin component.

Techniques for dispensing modelling paste are known in the art, e.g. by using Tattler Nodopox machinery. Conveniently, separate drums are filled with the resin and hardener components. The application of low pressure via a follower plate to the drums facilitates pumping of the materials. Preferably, pumps deliver the resin and hardener from the tanks to a mix block where the resin, and hardener are mixed. The residence time in the mix block, the speed of mechanical stirring and the length of the hose attached to the chamber influence the homogeneity of the mixture.

It is particularly preferred to use low viscosity resin mixtures, the preferred viscosity range is 1000 to 10,000 mPa s. Too high a viscosity in the components results in a need for high pressure pumping to dispense the paste. Much higher viscosity compositions are those applied known in the art as patties, which are semi-solid and are neither pumpable nor machine dispensable. Viscosity is preferably measured at 25 C and under shear rate of 0.01593 Hz. The preferred temperature resistance of the composition is in the range 140 to 220° C.

Preferably, the paste is used to create the whole structure by having 2 functions:
1) production of the sub-structure or core by bonding successive layers of honeycomb together, allowing this to cure and cutting undersize. In this case the paste is acting to adhere two substrates together.
2) production of smooth & machineable top surface covering whole structure. A layer of the same paste is dispensed onto the support structure surface with a high-output meter-mix machine in the form of a continuous layer covering the entire model, top surface as well as sides [sloping or vertical]. The paste is preferably applied at a thickness of from about 10 mm to about 40 mm thick, more preferably at about 20 mm thick. The paste is then cured and machined. The pastes of this invention particularly give seamless bonding and smooth surface to produce high functionality models and tools.

Cure of the curable resin can be effected in accordance with conventional practice in the particular application. In general, the composition can be allowed to cure at ambient temperature, optionally at this stage it may be rough cut to approximate dimensions, then post cured to effect full reaction, final cutting to the required dimensions may then be performed.

Typically, approximately 8 to 10 mm of material is removed during machining. The surfaces may be treated to seal the surface or provide a non stick surface before the model or tool is put into production.

The curable resin composition may be an epoxy resin and is a temperature resistant resin. It is required to exhibit good non-slump and sag resistance properties when laid horizontally oriented on a vertical surface. Typically, a minimum sag resistance of a 25 mm thickness on a vertical surface is required.

In order to meet the overall requirements for an acceptable temperature resistant material, the cured composition should have a heat deflection temperature (HDT) over 100° C., and preferably over 140° C., and a coefficient of thermal expansion (CTE) of less than $60 \times 10^{-6}$ ppm/K in the in use range and preferably less than $50 \times 10^{-6}$ ppm/K. When fine milling and/or high HDT is desired, it is preferred that the model or tool is post-cured before machining or cutting, preferably up to 200 C.

Machining or cutting can be carried out using conventional tools (e.g. lathe) or cutting machines, such as milling machines, machining centres and the like, in order to achieve the desired shape. The use of a computer numerical control (CNC) machine is preferred. The present invention is therefore suitable for the production of master models, design models, tracing models and prototype tools.

It will be appreciated that the total fabrication cost of a model or tool using the method of the present invention is simplified, more economical and faster than a conventional method which uses for example metal, epoxy blocks or patties, with adhesive foams and top pastes. An additional and important advantage is that the resulting model surface over the whole area [top as well as vertical or sloping sides] is seamless and free of bondlines.

This method is further advantageous in that the amount of material used is greatly reduced over the conventional method since only a thin layer is dispensed onto the substructure surface.

In addition to the advantages mentioned above (namely a faster process, better machinability, smoother surface characteristics, and greater overall efficiency), the paste used in the present invention can exhibit low linear shrinkage and can be used to produce large models that hold high tolerances. The finished article may have excellent edge strength, cured shore hardness, flexural strength, high heat deflection temperature and compressive strength, as well as a low thermal expansion coefficient.

Known prior art (U.S. Pat. No. 5,707,477) uses a build up method of bonding support layers together with an adhesive, curing of the adhesive, and hand application of a surface layer consisting of epoxy patties. The current invention can provide a much faster build up method using a machine mixed (and optionally applied) paste to both bond support layers and to create the surface layer.

The invention may provide a method of producing a model or tool comprising:
(a) building an assembly of substrates by assembling and adhering at least one substrate to another substrate with a layer of adhesive paste,
(b) covering the outer surface of the assembly of substrates with a continuous layer of curable paste, preferably machine dispensed
wherein the composition of the curable paste of step (b) is the same as the composition of at least one of the adhesive paste layers of step (a).

The invention furthermore provides a method of producing a model or tool comprising:
(a) building an assembly of substrates by assembling and adhering at least one substrate to another substrate with a layer of adhesive paste,
(b) covering the outer surface of the assembly of substrates with a continuous layer of curable paste, preferably machine dispensed
wherein the composition of the curable paste of step (b) is the same as the composition of at least one of the adhesive paste layers of step (a) and the composition of this curable paste comprises epoxy resin, amine hardener and polyethyleneimine.

WO 03/051649 proposes a method of making a light weight model using a curable modelling paste containing microballoons in an amount of 50 to 80% of the uncured paste by volume and the density of the uncured paste being in the range of 0.4 to 0.9 g/cm3. Light weight property is sought after for the model while a tool requires being resistant for example to pressure. The curable composition according to the invention might contain microballoons such as glass bubbles in a limited amount for retaining appropriate resistance. For example, the curable composition contains maximum 40%, 30%, 25%, 20% of glass bubbles by weight of the curable composition.

The present invention will now be illustrated by reference to the following non-limiting examples. All parts and percentages are provided on a weight basis unless indicated otherwise.

TABLE 1

Compounds used in Examples

| Material | Code | Supplier |
| --- | --- | --- |
| Bisphenol A epoxy resin | GY 260 | Huntsman |
| Bisphenol F epoxy resin | GY 281 | Huntsman |
| Fumed silica | Aerosil 380 | Degussa |
| Aluminium trihydrate powder | ULV 84 | Alcan |
| Aluminium trihydrate powder | DT 082 | Huntsman |

TABLE 1-continued

Compounds used in Examples

| Material | Code | Supplier |
|---|---|---|
| Dioctyl adipate | DOA | Generic chemical |
| Aluminium powder | Aluminium powder | Metaux et Chemie |
| Polyamine adduct | IP 262 | Huntsman |
| Polyethyleneimine dispersion | IP 232 | Huntsman |
| PTFE powder | PTFE | Shamrock |
| Glycidylamine epoxy resin | MY 0510 | Huntsman |
| Calcium carbonate powder | CaCO3 | Generic chemical |
| Glass bubbles | S60 | Sil trade |
| Epoxy diluent | DY 026 | Huntsman |
| Thermoplastic powder | Coathylene | Dupont |
| 1,2 biscyclohexylamine | DCH 99 | Dupont |
| Diethyltoluene diamine | DETDA | Albermarle |
| Methylpentamethylene diamine | MPMD | Dupont |
| Diphenyl diamino sulphone | DDS | Huntsman |
| Cycloaliphatic amine blend | Ancamine 2264 | Air products |
| Treated fumed silica | TS 720 | Cabot |

| Compound | Example 1 | Example 2 | Example 3 | Example 4 |
|---|---|---|---|---|
| Formulations: Part A | | | | |
| GY 260 | 32 | 30 | 54 | 20 |
| GY 281 | 8 | | | |
| DOA | 2 | | | |
| ULV 84 | 17 | 6 | | |
| Aerosil 380 | 3 | 5 | 4 | 6 |
| Al powder | 34 | | | |
| Ca stearate | 4 | | 4 | 4 |
| MY 0510 | | 30 | | 42 |
| PTFE | | | 4 | 4 |
| CaCO3 | | 4 | 11 | 10 |
| S60 | | 12 | 14 | 14 |
| DY 026 | | 5 | 8 | |
| Coathylene | | 8 | | |
| Formulations: Part B | | | | |
| IP 262 | 32 | | | |
| IP 232 | 2 | 1 | 1 | 1 |
| DT 082 | 28 | | | |
| ULV 84 | 35 | 37 | | |
| TS 720 | 3 | 3 | 1 | 2 |
| DCH 99 | | 13 | | |
| DETDA | | 13 | 19 | 22 |
| MPMD | | 9 | | |
| S60 | | 16 | 22 | 12 |
| Coathylene | | 8 | | |
| DDS | | | 8 | 8 |
| Ancamine 2264 | | | 16 | 24 |
| PTFE | | | 4 | 4 |
| CaCO3 | | | 29 | 27 |

Test Conditions:

The paste is dispensed onto the substructure at a thickness of between 15 to 50 mm and cured at ambient temperature (N.B. there should be no limitations on curing times or thickness of application) a rough milling step followed by post curing to at least the required in use temperature. The article is then shaped to its final contour by use of a Computer Numerical Control (CNC) machine. About 100 parts of Part A are mixed with about 50 parts of Part B. Density of Parts A and B are both approximately 1 g/cm3.

The paste is evaluated as follows. The sag resistance of the paste is measured prior to curing by dispensing the paste at a thickness of 15 to 50 mm horizontally on a vertical surface. The density and heat deflection (distorsion) temperature (HDT) of the paste are measured.

| Property | Example 1 | Example 2 | Example 3 | Example 4 |
|---|---|---|---|---|
| Peak Exotherm | 80° C. | 155° C. | 36° C. | 42° C. |
| Sag | 40 mm OK | 30 mm OK | 35 mm OK | 40 mm OK |
| Density | 1.6 | 1.1 | 1.1 | 1.1 |
| Thermal Properties | 80° C. HDT | 140° C. | 140° C. | 209° C. |

HDT is the heat distortion temperature and is a measure of the softening point which gives the effective limit of thermal resistance and is measured according to ISO 75.

Example 1

The experimental results illustrate the excellent performance characteristics of the pastes prepared. Notably, the paste gives excellent sag resistance properties and moderate temperature resistance. However HDT of the cured paste is under 100° C. indicating a low degree of accurate shape retention upon heating, which can be detrimental for a tool.

Example 2

The experimental results illustrate the excellent performance characteristics of the pastes prepared. Notably, the paste gives excellent sag resistance properties and high temperature resistance. However the high exotherm is undesirable as this may result in stresses, shrinkage and dimensional distortion.

Example 3

The experimental results illustrate the excellent performance characteristics of the pastes prepared. Notably, the paste gives excellent sag resistance properties and high temperature resistance. The exotherm is reduced dramatically.

Example 4

The experimental results illustrate the excellent performance characteristics of the pastes prepared. Notably, the paste gives excellent sag resistance properties and very high temperature resistance. The exotherm is low. Surprisingly this example also gave outstanding adhesion to the honeycomb which had to be broken to separate honeycomb from the cured paste. The shrinkage on curing was surprisingly low with no measurable shrinkage seen for this example on post curing.

The properties of the pastes show that these formulations are superior for the preparation of a seamless modelling or tooling paste due to improved dispensing characteristics as indicated by the high resistance to sag of the dispensed paste and increased temperature resistance. Additionally the use of a semi latent hardener (DDS) in examples 3 and 4 reduces the exotherm enabling a higher dimensional accuracy through reduced warping and shrinkage.

The experimental results illustrate the excellent performance characteristics of the pastes prepared. Notably, the paste gives excellent sag resistance properties and improved high temperature resistance. Additionally the peak exotherm is reduced dramatically.

A further advantage of using a semi latent hardener is that optionally the paste may be CNC machined while in a semi cured state enabling easier cutting.

An example process for building a tool and using the tool to create a high temperature composite part using a hand layup method is described below.

A base plate of a suitable material with sufficient stiffness is prepared (usually Aluminium or steel) and a thin layer of paste is applied to the surface according to the dimensions of the tool required. The paste is mixed and dispensed using e.g. using a Tattler Nodopox machine. Aluminium or Nomex Honeycomb (or other material) is laid onto the paste layer and pushed down into the paste to create good contact and ensure adhesion, further layers of paste and honeycomb are applied until the required size is achieved. The paste is allowed to cure at room temperature and then the honeycomb milled to undersize of the final surface (optionally pre-cut honeycomb may be used which removes the need for this curing and cutting stage). The surface layer is then applied across the honeycomb. The paste is then cured at room temperature and rough milled then post cured and final milling (optionally post curing may be done before cutting and cutting done in one stage).

The surface is then prepared by sanding smooth and the application of a release agent.

Parts are then made by application of a gel coat (for example SW 5200 with HY 5212 available from Huntsman Advanced Materials) which is cured to a tacky stage. A laminating resin is then applied in a thin layer (for example LY 5210 with HY 5210 available from Huntsman Advanced Materials) and a layer of fabric applied (Carbon, glass or aramid), the resin is allowed to impregnate the fabric this can be helped using a roller or brush etc. Further layers of resin and fabric are applied until the required thickness of part is achieved.

Preferably the composite contains fire retardant additives, such as expandable graphite, silicon containing materials, nano filler [e.g. nano-clays], organophosphorus materials, most preferably non-halogenated fire retardants.

The part is then cured according to the requirements of the composite part (up to 180° C.) after which demoulding and finishing are performed. This results in a finished part which may be produced much quicker than current methods.

Such moulded composites are useful for production of large light weight, strong objects/parts for the aerospace, auto, rail, marine, wind energy, furniture, and construction [e.g. leisure facilities, exhibitions, films and theater models] industries.

The invention claimed is:

1. A method of producing a model or tool comprising the sequential steps of:
   (a) mixing a first component containing a curable epoxy resin and a thixotropic agent with a second component containing a hardener system comprising at least one polyethyleneimine, at least one other amine having at least two amino hydrogen groups and a complex of a Lewis acid and a Lewis base having latent reactivity in a mix block to form a curable paste wherein the curable paste has a density of between 1.1-1.6 g/cm$^3$;
   (b) machine dispensing the curable paste on an outer surface of a substructure in the form of a continuous layer;
   (c) curing the continuous layer of curable paste at room temperature;
   (d) post-curing the layer of paste at a temperature of at least 50° C.; and
   (e) machining the cured continuous layer to produce the model or tool wherein the thixotropic agent comprises hydrophilic fumed silica, the Lewis acid is $BX_3$, $AlX_3$, $FeX_3$, $FeX_2$, $ZnX_2$, $TiX_3$ or $TiX_4$ where X independently represents a $C_{1-6}$ alkyl group, $C_{1-6}$ alkoxy group, hydrogen, bromine, iodine or fluorine atom provided that when the Lewis acid is $BX_3$ no X represents a fluorine atom, the Lewis base is ammonia or a compound of the formula $Z(Ra)_3$ in which Z is nitrogen or phosphorus and each Ra independently represents a hydrogen atom; an alkyl group having from 1 to 20 carbon atoms optionally substituted by one or more phenyl groups in which each phenyl group may be optionally substituted by one or more $C_{1-12}$ alkyl groups and/or halogen atoms; a phenyl group optionally substituted by one or more $C_{1-12}$ alkyl groups and/or halogen atoms; a $C_{5-7}$ cycloalkyl group; or two Ra's together represent an alkylene group having from 4 to 6 carbon atoms one or more of which may be replaced by an oxygen or a sulphur atom and the curable paste after curing has a heat deflection temperature above 100° C.

2. The method of claim 1, wherein the final cured model or tool is machined to form a model or tool for producing laminated composites.

3. A curable seamless modelling paste comprising:
   (a) an epoxy resin;
   (b) a thixotropic agent comprising hydrophilic fumed silica; and
   (c) a hardener system containing at least one polyethyleneimine compound, at least one other amine having at least two amino hydrogen groups to effect curing at room temperature, and a complex of a Lewis acid and a Lewis base having latent reactivity to effect curing at a temperature of at least 50° C. wherein the Lewis acid is $BX_3$, $AlX_3$, $FeX_3$, $FeX_2$, $ZnX_2$, $TiX_3$ or $TiX_4$ where X independently represents a $C_{1-6}$ alkyl group, $C_{1-6}$ alkoxy group, hydrogen, bromine, iodine or fluorine atom provided that when the Lewis acid is $BX_3$ no X represents a fluorine atom and the Lewis base is ammonia or a compound of the formula $Z(Ra)_3$ in which Z is nitrogen or phosphorus and each Ra independently represents a hydrogen atom; an alkyl group having from 1 to 20 carbon atoms optionally substituted by one or more phenyl groups in which each phenyl group may be optionally substituted by one or more $C_{1-12}$ alkyl groups and/or halogen atoms; a phenyl group optionally substituted by one or more $C_{1-12}$ alkyl groups and/or halogen atoms; a $C_{5-7}$ cycloalkyl group; or two Ra's together represent an alkylene group having from 4 to 6 carbon atoms one or more of which may be replaced by an oxygen or a sulphur atom and wherein the curable seamless modelling paste has a density of between 1.1-1.6 g/cm$^3$ and the curable seamless modelling paste after curing has a heat deflection temperature above 100° C.

4. The paste of claim 3 wherein the hydrophilic fumed silica is present at an amount of 1% to 20% by weight, based on the weight of the epoxy resin.

5. The paste of claim 3 wherein the polyethyleneimine compound is present at an amount from 0.2 to 2 parts by weight, per 100 parts by weight of the epoxy resin.

* * * * *